(12) United States Patent
Yang et al.

(10) Patent No.: US 7,593,328 B2
(45) Date of Patent: Sep. 22, 2009

(54) FLOW CONTROL METHOD USING FEEDBACK TO CONTROL FLOW ON THE NETWORK, SWITCH AND CHANNELS IN LARGE COMMUNICATION NETWORKS

(75) Inventors: Wu Yang, Guangdong (CN); Yao Liu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 11/131,966

(22) Filed: May 18, 2005

(65) Prior Publication Data

US 2005/0270976 A1    Dec. 8, 2005

Related U.S. Application Data

(63) Continuation of application No. PCT/CN03/000982, filed on Nov. 19, 2003.

(30) Foreign Application Priority Data

Nov. 19, 2002    (CN)    ............................ 02 1 48769

(51) Int. Cl.
*H04L 1/00*    (2006.01)
*H04L 12/26*    (2006.01)
*G06F 15/16*    (2006.01)

(52) U.S. Cl. .................... 370/230; 370/231; 370/232; 370/236; 709/232; 709/233; 709/235

(58) Field of Classification Search ............... 707/204; 370/392, 231, 229, 236
See application file for complete search history.

(56) References Cited

U.S. PATENT DOCUMENTS 6,118,761 A    9/2000    Kalkunte et al. ............ 370/229

FOREIGN PATENT DOCUMENTS

CN    1353367    6/2002

(Continued)

OTHER PUBLICATIONS

International Search Report in PCT/CN03/00982 dated Mar. 4, 2004.

(Continued)

*Primary Examiner*—Kwang B Yao
*Assistant Examiner*—Adam Duda
(74) *Attorney, Agent, or Firm*—Marshall, Gerstein & Borun LLP

(57) ABSTRACT

A flow control method of MAN transmission equipment is disclosed wherein when congestion occurs in a data transmission port of a data transmission equipment at a receiving end, an Ethernet flow control frame is fed back to a transmission equipment at a sending end, to perform flow control of the data transmission port. When congestion occurs in a board of the data transmission port, a board-level flow control frame is fed back to a packet forwarding module of the data transmission port, to perform flow control of the board. When congestion occurs in a logical sub-channel of the board, a channel-level flow control frame is fed back to the packet forwarding module of the data transmission port, to perform flow control of the logical sub-channel. The disclosed method comprises implementation of flow control strategy of MAN transmission equipment, making MAN flow control strategy more preferable, and satisfying flow control service requirement of a complicated Ethernet MAN transmission equipment.

16 Claims, 4 Drawing Sheets

FOREIGN PATENT DOCUMENTS

| | | |
|---|---|---|
| EP | 0 838 972 | 4/1998 |
| WO | WO 01/76138 A2 | 10/2001 |
| WO | WO 01/76138 A3 | 10/2001 |

OTHER PUBLICATIONS

Christensen et al., "Comparison of the Gigabit Ethernet Full-Duplex Repeater, CSMA/CD, and 1000/100-Mbps Switched Ethernet," 23$^{rd}$ Annual Conference on Lo Local Computer Networks (1998).

Luijten et al., "Shared Memory Switching + Virtual Output Queuing: A Robust and Scalable Switch," Proceedings of the 2001 IEEE International Symposium on Circuits and Systems (2001).

Noureddine et al., "Selective Back-Pressure in Switched Ethernet LANs," IEEE Global Telecommunications Conference (1999).

Schoenen et al., "Closed Loop Credit-Based Flow Control with Internal Backpressure in Input and Output Queued Switches," Proceedings of the IEEE Conference 2000 on High Performance Switching and Routing (2000).

European Office Action for Application No. 03811330.4-2416, dated Sep. 29, 2006.

European Search Report for Application No. 03811330.4-2416, dated Jul. 28, 2006.

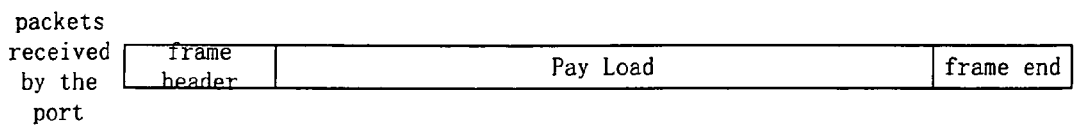
Fig. 5a
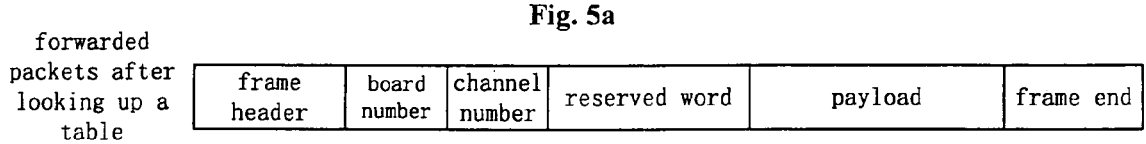
Fig. 5b
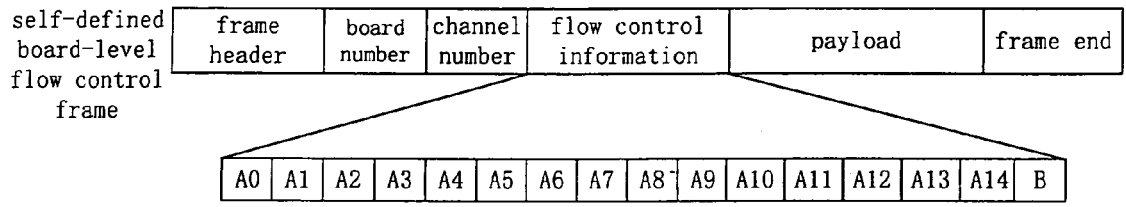
Fig. 5c
Fig. 5

FLOW CONTROL METHOD USING FEEDBACK TO CONTROL FLOW ON THE NETWORK, SWITCH AND CHANNELS IN LARGE COMMUNICATION NETWORKS

CROSS-REFERENCE TO RELATED APPLICATION

This is a continuation of copending International Application No. PCT/CN2003/000982, filed Nov. 19, 2003, the entire disclosure of which is incorporated herein by reference.

BACKGROUND OF THE INVENTION

1. Field of the Invention

The invention relates generally to the field of data transmission, especially to a flow control method of MAN (Metropolitan Area Network) transmission equipment.

2. Related Technology

In MAN devices based on a SDH (Synchronous Digital Hierarchy), data from users need to be mapped to the SDH for transmission. If data quantity transmitted from a sending end exceeds the processing capability of a receiving end, congestion will occur, thus flow control is required.

At present, for MAN transmission equipment, flow control is mostly implemented by adopting an Ethernet flow control mechanism based on a data transmission port, which is defined in IEEE standards. When data quantity in a buffer of data transmission port of a receiving end exceeds a specified maximum threshold, the data transmission port sends to the sending end a standard 802.3x flow control frame, and the sending end determines whether to end the flow control state according to a flow control time in the flow control frame. When the flow control time is up, data transmission is continued.

The flow control of 802.3x standard complies with a standard IEEE protocol, which is mature and easily implemented. However, in terms of flow control of this standard, it is determined whether to end flow control state according to the flow control time carried by the flow control frame, thus poor real-time quality occurs. On the other hand, the flow control of 802.3x standard is the one based on Ethernet data transmission port, so flow control for a transmission board and a mapping channel in an Ethernet Metropolitan Area transmission equipment cannot be implemented. With the number of boards and logical sub-channels in MAN transmission equipment increasing, the probability of congestion of board or logical sub-channels also increases. When congestion occurs in boards or logical sub-channels of receiving ends, the data transmission ports of sending ends will not pause data transmission to boards and logical sub-channels, thus leading to breakdown of boards or logical sub-channels, being unable to satisfy flow control service requirements of the complicated Ethernet Metropolitan Area transmission equipment.

GENERAL DESCRIPTION

A flow control method of a MAN transmission equipment is provided in order to further implement flow control on the board level and on the logical sub-channel level on the foundation of traditional Ethernet data transmission port flow control, and increase the desirability of flow control of Ethernet Metropolitan Area transmission equipment.

The invention may be implemented through the following specific scheme.

A flow control method of MAN transmission equipment according to the invention comprises detecting whether congestion occurs in a data transmission port of a transmission equipment at a receiving end; if yes, a packet forwarding module feeding back an Ethernet flow control frame to transmission equipment at a sending end, the transmission equipment at the sending end pausing sending data packets after receiving the Ethernet flow control frame; detecting whether congestion in the data transmission port is over; if yes, the transmission equipment at the sending end continuing to transmit data packets, otherwise the packet forwarding module at the receiving end continuing to feeding back the Ethernet flow control frame to the transmission equipment at the sending end, thereby establishing flow control of the data transmission port;

detecting whether congestion occurs in a board of the data transmission port; if yes, a board mapping module feeding back a board-level flow control frame to the packet forwarding module, the packet forwarding module pausing sending data packets to the board after receiving this board-level flow control frame; detecting whether congestion in the board of the data transmission port is over; if yes, the packet forwarding module continuing to send data packets to the board, otherwise the board mapping module continuing to feed back the board-level flow control frame to the packet forwarding module, thereby establishing flow control of the board;

detecting whether congestion occurs in a logical sub-channel of the board; if yes, the logical sub-channel mapping module feeding back to the packet forwarding module a channel-level flow control frame which is forwarded by the board mapping module, the packet forwarding module pausing sending data packets to the logical sub-channel after receiving this channel-level flow control frame; detecting whether congestion in the logical sub-channel of the board is over; if yes, the packet forwarding module continuing to send data packets to the logical sub-channel, otherwise the logical sub-channel mapping module continuing to feed back the channel-level flow control frame to the packet forwarding module, thereby establishing flow control of the logical sub-channel.

The step of detecting whether congestion occurs in a data transmission port of the transmission equipment at the receiving end may comprise the step of:

detecting whether data packet quantity in the data transmission port buffer exceeds a predefined maximum threshold.

The step of detecting whether congestion in the data transmission port is over may comprise the step of:

the packet forwarding module detecting whether data packet quantity in the data transmission port buffer is less than a predefined minimum threshold, or the transmission equipment at the sending end detecting whether al flow control time in the Ethernet flow, control frame is over; and establishing the Ethernet flow control frame after the packet forwarding module receives a back pressure signal generated by the data transmission port buffer.

The step of detecting whether congestion occurs in the board of the data transmission port may comprise the step of detecting whether data packet quantity in the board buffer exceeds a predefined maximum threshold.

The step of detecting whether congestion in the board of the data transmission port is over may comprise detecting whether data packet quantity in the board buffer is less than the predefined minimum threshold; and establishing the board-level frame after the board mapping module receives a back pressure signal generated by the board buffer.

In addition, the step of detecting whether congestion occurs in the logical sub-channels of the board may comprise detecting whether data packet quantity in logical sub-channel buffer exceeds a predefined maximum threshold, where the step of detecting whether congestion in the logical sub-channel of the board is over may comprise detecting whether data packet quantity in the logical sub-channel buffer is less than a predefined minimum threshold.

The step of the logical sub-channel mapping module channel-level flow control framefeeding back to the packet forwarding module through the board mapping module may comprise the steps of:

the logical sub-channel buffer generating a back pressure signal, the logical sub-channel mapping module receiving this back pressure signal to generate the channel-level flow control frame and transparently transmitting to the packet forwarding module through the board mapping module.

The step of the logical sub-channel mapping module feeding back channel-level flow control frame to the packet forwarding module through the board mapping module may comprise the step of:

the logical sub-channel buffer generating a back pressure signal, the logical sub-channel mapping module receiving this back pressure signal, generating the channel-level flow control frame, the board mapping module combining the channel-level flow control frame with the board-level flow control frame as one board-level flow control frame, then feeding back this combined board-level flow control to the packet forwarding module.

Preferably, the board-level flow control frame or the channel-level flow control frame is a normal data packet carrying flow control information, or a null frame carrying flow control information.

Preferably, the board-level flow control frame or the channel-level flow control frame carries flow control information of all boards.

Preferably, the board-level frame at least sequentially comprises an SOF (Start of Frame), a board number, a logical sub-channel number, flow control information, a payload and an EOF (End of Frame); wherein the flow control information at least comprises 15-bit board congestion information indicator and 1-bit frame type indicator; the board number is 4-bit, the logical sub-channel number is 8-bit.

Preferably, the channel-level flow control frame at least sequentially comprises an SOF (Start of Frame), a board number, a logical sub-channel number, flow control information, a payload and an EOF (End of Frame); wherein the flow control information at least comprises 14-bit board congestion information indicator and 1-bit current channel congestion information indicator, and 1-bit frame type indicator; board number is 4-bit; the logical sub-channel number is 8-bit.

In the invention, by making use of hardware counter pressure mechanism and combing with self-defined flow control frames, through adopting a mode of letting normal data packets carry flow control information or generating null frames carrying flow control information, flow control strategy of MAN transmission equipment is extendedly implemented, so that the flow control strategy of MAN is more preferable, satisfying flow control service requirement of complicated Ethernet Metropolitan Area transmission equipment, with the advantages of simple hardware circuitry, flexible flow control, easy to be updated, etc. Comparing with sheer hardware implementation, the cost is greatly reduced, maintenance of device is enhanced, and real-time quality of congestion control is much better.

BRIEF DESCRIPTION OF THE DRAWINGS

FIG. 5a is the message format received by a data transmission port, FIG. 5b is the message format when a packet forwarding module performs look-up forwarding, FIG. 5c is the format of board-level flow control frame;

DETAILED DESCRIPTION

The invention will be described in detail with reference to the accompanying drawings.

According to characteristics of the MAN transmission equipment, a flow control method based on "flow control on data transmission port level+board-level flow control+channel-level flow control" is put forward in the invention.

Figures 1, 2:
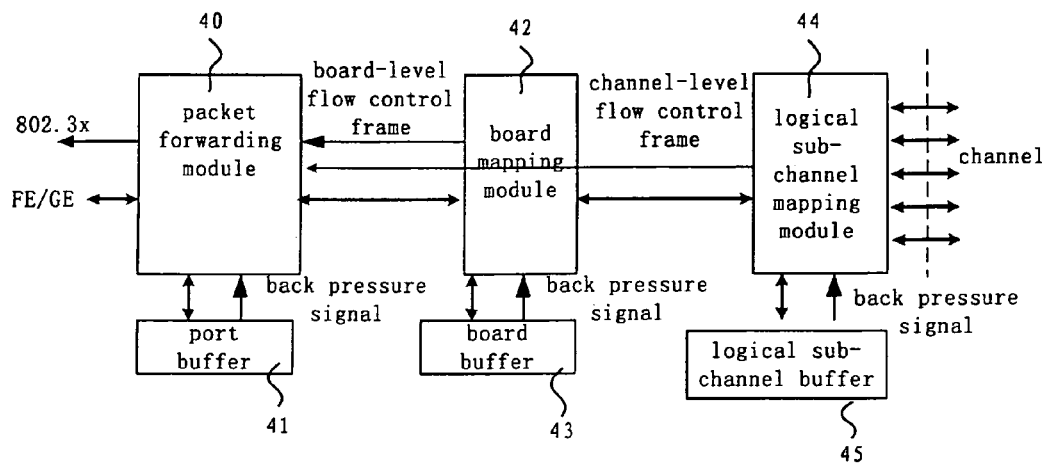
FIG. 1 is the general technology scheme of the invention.
FIG. 2 is the format of a 802.3x flow control frame.

With reference to FIG. 1, namely the general technology scheme sketch map of the invention, thick continuous line denotes data flow transmission and thin continuous line denotes flow control frame transmission. Generally speaking, more than one board is connected with one data transmission port, and one board has more than one logical sub-channels.

In MAN transmission equipment, data packets from the FE/GE data transmission port are forwarded to the logical sub-channel, the specific course is: firstly, a packet forwarding module 40 stores the received data packets in a data transmission port buffer 41, and adds board number information and channel number information to data packets according to the result of lookup table, then forwards the data packets to a board mapping module 42; in succession, the board mapping module 42 stores the data packets from packet forwarding module 40 in a board buffer 43, then forwards the data packets to corresponding transmission boards to complete data packet forwarding based on board numbers; at last, a logical sub-channel mapping module 44 stores the data packets from the board in a logical sub-channel buffer 45, then forwards the data packets to corresponding logical sub-channels to complete data packet forwarding based on logical sub-channel numbers.

When data packets transmitted by the data transmission port of the sending end overrun the processing ability of the packet forwarding module 40, accordingly the current data packet number of data transmission port buffer 41 exceeds a predefined maximum threshold, the data transmission port buffer 41 generates a hardware back pressure signal XON/OFF with value 1; on inspecting this back pressure signal, the packet forwarding module 40 generates a standard 802.3x flow control frame and transmits it to the data transmission port in the receiving end; then the data transmission port in the receiving end transmits this flow control frame to the sending end; on receiving the 802.3x flow control frame, the sending end pauses transmitting data packets to the receiving end; in the same way, receiving a flow control frame from the sending end, the receiving end also pauses transmitting data packets to the sending end, in order to perform flow control and avoid congestion, establishing flow control based on data transmission ports.

With reference to FIG. 2, a format of the mentioned 802.3x flow control frame comprises Destination MAC, Source MAC, Type field, Opcode, Slot Time that namely is the flow control time, and packet length, wherein Destination MAC is constant as 0180c2000001, Source MAC is ignored during receiving course and is set as 000000000000 during transmitting course, Type Field is constant as 0×0001, and Slot Time can be set as users like.

Figure 3:
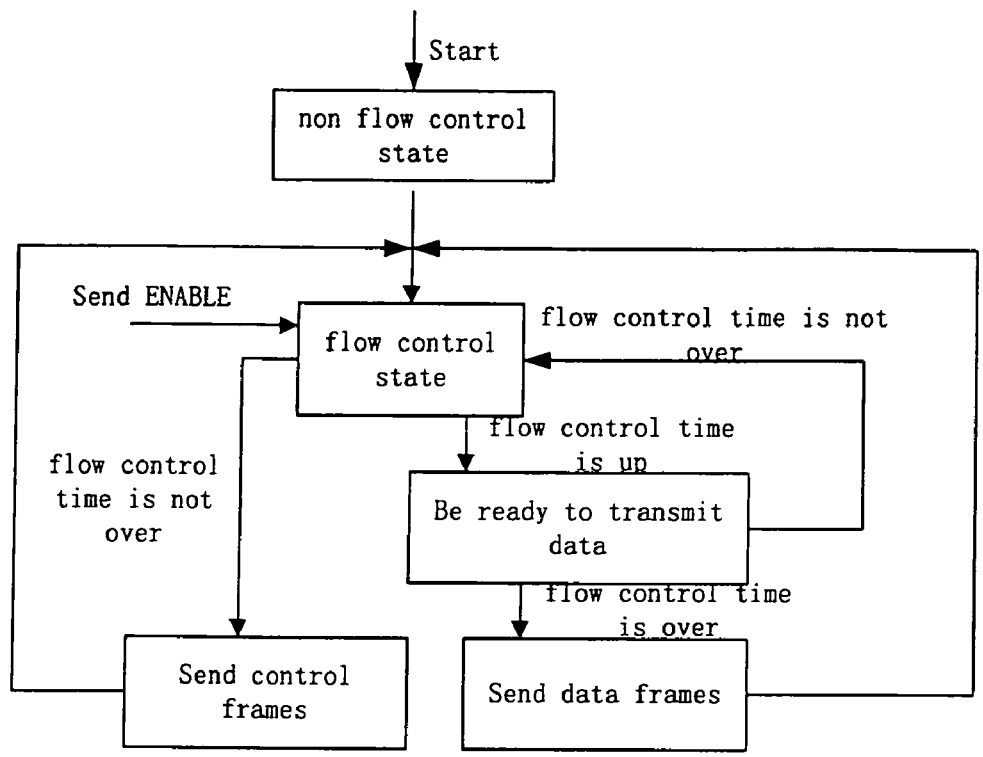
FIG. 3 is the transmitting state sketch map of flow control operation.

FIG. 3 is the transmitting state sketch map of flow control operation. When the sending end receives the 802.3x flow control frame, the sending end changes from a non flow control state to a flow control state. According to the Slot Time in the 802.3x flow control frame, the sending end detects whether to end flow control state; if Slot Time is over, data packets are transmitted; otherwise, a control frame is transmitted. The operation of receiving flow control frame doesn't affect the transmission of current data packets, so that it is guaranteed that there is no data packet loss during flow control processing course.

When data packets are forwarded to the board mapping module 42, if the current data packet quantity in the board buffer 43 exceeds a predefined threshold, the board buffer 43 generates a hardware back pressure signal XON/OFF; having received the hardware back pressure signal, the board mapping module 42 generates a board-level flow control frame fed back to the packet forwarding module 40 and pauses transmitting data packets to this transmission board; if current data packets in the board buffer 43 are under a predefined minimum threshold, or if the flow control time in the Ethernet flow control frame is over, the board buffer 43 generates a hardware back pressure signal XON/OFF with value 0, and this signal is transmitted to the board mapping module 42 in order to stop executing flow control, so that flow control based on board level is established. Meanwhile, if the data transmission port buffer 41 generates the hardware back pressure signal, so that packet forwarding module 40 transmits the 802.3x flow control frame to the sending end, establishing flow control of data transmission port, accordingly implementing "flow control on data transmission port level+board-level flow control."

When data packets are forwarded to the logical sub-channel mapping module 44, if the current data packet quantity in the logical sub-channel buffer 45 exceeds a predefined threshold, the logical sub-channel buffer 45 generates a hardware back pressure signal XON/OFF, the logical sub-channel mapping module 44 generates channel-level flow control frame while receiving this back pressure signal, then this channel-level flow control frame is fed back to the board mapping module 42, the board mapping module 42 then transmits this frame to the packet forwarding module 40, the packet forwarding module 40 stops transmitting data packets while receiving this channel flow control frame; if the data packets in the logical sub-channel buffer 45 are less than a predefined minimum threshold, the logical sub-channel buffer 45 generates a hardware back pressure signal XON/OFF with value 0, and this signal is sent to the logical sub-channel mapping module 44 so as to stop executing flow control, establishing channel-level flow control. Meanwhile, if the data transmission port buffer generates the hardware back pressure signal, so that packet forwarding module transmits the 802.3x flow control frame to the sending end, establishing flow control of data transmission port, accordingly implementing "flow control on data transmission port level+channel-level flow control."

Furthermore, if the board buffer 43 generates the hardware back pressure signal, so that board mapping module 42 generates the board-level flow control frame, the board mapping module combines the board-level flow control frame and the channel-level flow control frame, then transmits the combined board-level flow control frame to the packet forwarding module 40, establishing board-level flow control, accordingly implementing the flow control based on "flow control on data transmission port level+board-level flow control+channel-level flow control."

Further associating the board-level flow control frame and the channel-level flow control frame, the implementing methods of board-level flow control and channel-level flow control are particularly described as follows.

Figure 4:
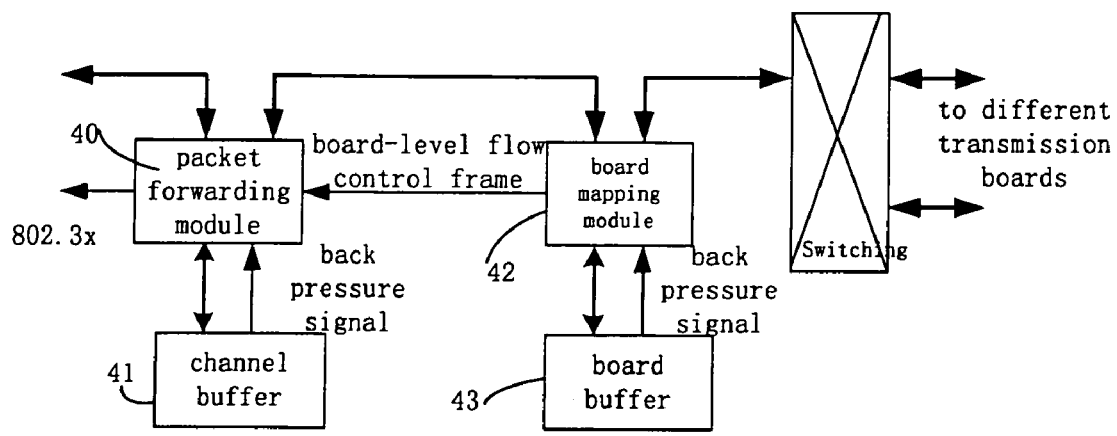
FIG. 4 is the sketch map of board-level flow control.

With reference to both FIG. 1 and FIG. 4, the thick continuous line in FIG. 4 denotes transmission of the data stream, and the thin continuous line denotes transmission of a flow control frame. The packet forwarding module 40 receives data packets from the FE/GE data transmission port, based on the requirement of current transmission service, and data packets are forwarded according to data transmission port, users, VLAN (Virtual Local Area Network) or themselves.

Therein, the data transmission port packet format is shown in FIG. 5a, which comprises SOF (Start of Frame), PAYLOAD, and EOF (End of Frame). To guarantee that data packets are trouble-freely forwarded to corresponding logical sub-channels, the board numbers and the channel numbers acquired by looking up table are inserted into data packets, thereby establishing a forwarded packet after looking up a table. The forwarded packet after looking up the table is transmitted to the next hierarchy.

The forwarded packet after looking up the table is shown in FIG. 5b, this packet is on the basis of data transmission port packet, further comprising, 4-bit board number, 8-bit channel number and 16-bit Rev (reserved word) between SOF and PAYLOAD. When the data packet quantity in the board buffer 43 exceeds the predefined threshold, congestion occurs and the hardware back pressure signal XON/OFF is generated, then the board mapping module 42 generates the board-level flow control frame and transmits this frame to the packet forwarding module 40.

The board-level-flow control frame is as shown in FIG. 5c, this frame structure is based on the forwarded packet after looking up the table. The 16-bit reserved word in the forwarded packet after looking up the table is set as 16-bit flow control information comprising 15-bit board congestion indicator A0~A14 and 1-bit frame type indicator B, wherein every bit of A0~A14 denotes the congestion situation of each board, mapping to 15 boards; Value 0 denotes Non-congestion and value 1 denotes Congestion. Type indicator B denotes whether the current frame is a null frame only carrying flow control information, with value 0 denoting normal data packet and value 1 denoting a null frame only carrying flow control information. Since there is the frame type indicator in flow control information, there are two ways for denoting congestion information, one is B=1, generating a null frame carrying flow control information; another is B=0, flow control information being carried in normal data packets. In order to effectively utilize a bandwidth, the two ways above are both adopted. When congestion occurs and at the same time data packets of transmission board are being transmitted to the FE/GE data transmission port, the way of normal data packet carrying flow control information is adopted; when congestion occurs and at the same time no data packet is being transmitted to FE/GE data transmission port, the way of generating a null frame carrying flow control information is adopted. In order to better the real-time quality of board flow control, every data packet carries the flow control information of all boards.

Figure 6:
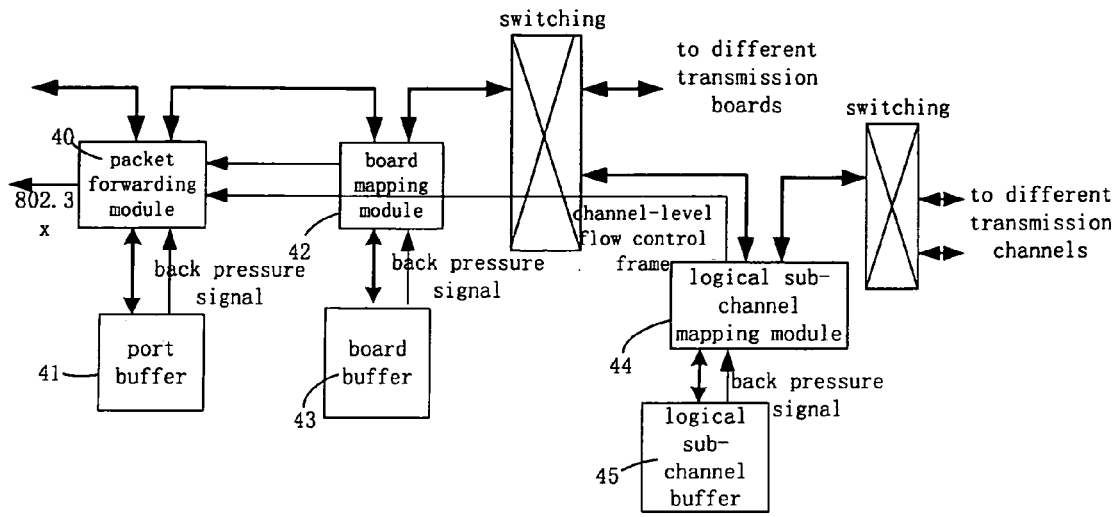
FIG. 6, is the flow control sketch map of logical sub-channel.

With reference to FIG. 6, similar to board flow control, when the data packet quantity in the logical sub-channel-level buffer exceeds the predefined threshold, congestion occurs and the hardware back pressure signal XON/OFF is generated, then the logical sub-channel mapping module generates the channel-level flow control frame and transmits this frame to the packet forwarding module 40. Since there are many logical sub-channels, it's impossible to denote the congestion states of all channels in flow control information, therefore a flag indicating the congestion situation of current channel is added to the flow control information, companying with the congestion situation of transmission board.

Figure 7:
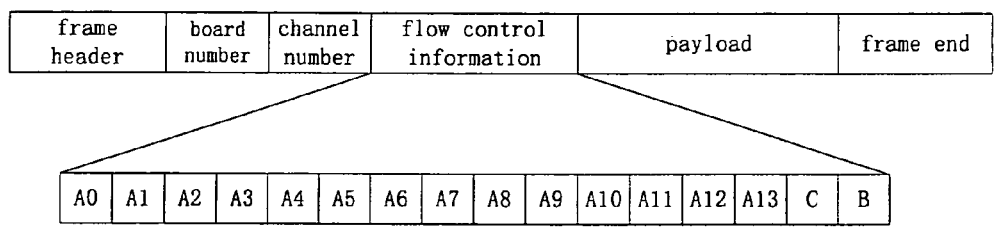
FIG. 7 is the format of channel-level flow control frame.

A frame structure is shown in FIG. 7. The channel-level flow control frame comprises SOF, 4-bit board number information, 8-bit channel number information, 16-bit flow control information, PAYLOAD, and EOF. Flow control information comprises 14-bit board congestion information flag A0~A13, 1-bit congestion information flag C of current channel and 1-bit frame type flag B. This is similar to flow control information in board-level flow control frame, where every bit of A0~A13 denotes congestion information of each board, mapping to 14 boards, B denotes whether the current frame is a null frame only carrying flow control information, and C denotes whether there is congestion in a channel determined by the board number and the channel number.

Both the board-level flow control and channel-level flow control above are based on hardware counter pressure, adding flow control information to data packets or generating a null frame carrying flow control information, performing flow control to the congested transmission board or logical sub-channel. Then through flow control based on data transmission port level, the standard 802.3x flow control frame is fed back to the upper device, implementing board-level or channel-level flow control.

The invention claimed is:

1. A flow control method comprising;
   detecting whether congestion occurs in a data transmission port of a transmission equipment at a receiving end and, if yes, a packet forwarding module feeding back an Ethernet flow control frame to the transmission equipment at a sending end, the transmission equipment at the sending end pausing sending data packets after receiving the Ethernet flow control frame;
   detecting whether congestion in the data transmission port is over and, if yes, the transmission equipment at the sending end continuing to transmit data packets, otherwise the packet forwarding module at the receiving end continuing to feed back the Ethernet flow control frame to the transmission equipment at the sending end, thereby establishing flow control of the data transmission port;
   detecting whether congestion occurs on one board connecting with the data transmission port and, if yes, a board mapping module feeding back a board-level flow control frame to the packet forwarding module, the packet forwarding module pausing sending data packets to the board connecting with the data transmission port after receiving the board-level flow control frame; and
   detecting whether congestion in the board connecting with the data transmission port is over and, if yes, the packet forwarding module continuing to send the data packets to the board connecting the data transmission port, otherwise the board mapping module continuing to feed back the board-level flow control frame to the packet forwarding module thereby establishing flow control of the board connecting with the data transmission port of the transmission equipment.

2. The flow control method according to claim 1, comprising:
   detecting whether congestion occurs in the data transmission port of the transmission equipment at the receiving end, comprises detecting whether data packet quantity in a data transmission port buffer exceeds a predefined maximum threshold;
   detecting whether congestion in the data transmission port is over, comprises the packet forwarding module detecting whether the data packet quantity in the data transmission port buffer is less than a predefined minimum threshold, or the transmission equipment at the sending end detecting whether a flow control time in the Ethernet flow control frame is over; and
   establishing the Ethernet flow control frame after the packet forwarding module receives a back pressure signal generated by the data transmission port buffer.

3. The flow control method according to claim 1, comprising:
   detecting whether congestion occurs on the one board connecting with the data transmission port, comprises detecting whether data packet quantity in the a board buffer exceeds a predefined maximum threshold;
   detecting whether congestion in the one board connecting with the data transmission port is over, comprises detecting whether the data packet quantity in the board buffer is less than a predefined minimum threshold; and
   establishing the board-level flow control frame after the board mapping module receives a back pressure signal generated by the board buffer.

4. The flow control method according to claim 1, further comprising:
   detecting whether congestion occurs in one of logical sub-channels of the board connecting with the data transmission port of the transmission equipment, if yes, a logical sub-channel mapping module feeding back to the packet forwarding module a channel-level flow control frame which is forwarded through the board mapping module, the packet forwarding module pausing sending data packets to the logical sub-channel of the board after receiving the channel-level flow control frame; detecting whether congestion in the logical sub-channel of the board is over, if yes, the packet forwarding module continuing to send data packets to the logical sub-channel of the board, otherwise the logical sub-channel mapping module continuing to feed back the channel-level flow control frame to the packet forwarding module, thereby to establish flow control of the logical sub-channel of the board.

5. The flow control method according to claim 1, wherein the board-level flow control frame is a normal data packet carrying flow control information, or a null frame carrying flow control information.

6. The flow control method according to claim 1, wherein the board-level flow control frame or the channel-level flow control frame carries flow control information of all the boards connecting with the data transmission port of the transmission equipment.

7. The flow control method according to claim 1, wherein the board-level flow control frame at least sequentially comprises an SOF (Start of Frame), a board number, a logical sub-channel number, flow control information, a payload and an EOF (End of Frame); and wherein the flow control information at least comprises 15-bit board congestion information indicator and 1-bit frame type indicator; the board number is 4-bit, and the logical sub-channel number is 8-bit.

8. The flow control method according to claim 4, wherein the board-level flow control frame or the channel-level flow control frame carries flow control information of all the boards connecting with the data transmission port of the transmission equipment.

9. The flow control method according to claim 4, the logical sub-channel mapping module feeding back to the packet forwarding module a channel-level flow control frame, further comprising:
a logical sub-channel buffer generating a back pressure signal, the logical sub-channel mapping module receiving the back pressure signal, generating the channel-level flow control frame and transparently transmitting the channel-level flow control frame to the packet forwarding module through the board mapping module.

10. The flow control method according to claim 4, the logical sub-channel mapping module feeding back to the packet forwarding module a channel-level flow control frame, further comprising:
a logical sub-channel buffer generating a back pressure signal, the logical sub-channel mapping module receiving the back pressure signal, generating the channel-level flow control frame, the board mapping module combining the received channel-level flow control frame with the board-level flow control frame as one board-level flow control frame, then transmitting the combined board-level flow control frame to the packet forwarding module.

11. The flow control method according to claim 4, wherein the channel-level flow control frame at least sequentially comprises an SOF (Start of Frame), a board number, a logical sub-channel number, flow control information, a payload and an EOF (End of Frame); and
wherein the flow control information at least comprises 14-bit board congestion information indicator and 1-bit current channel congestion information indicator, and 1-bit frame type indicator; the board number is 4-bit, and the logical sub-channel number is 8-bit.

12. The flow control method according to claim 4, wherein the channel-level flow control frame is a normal data packet carrying flow control information, or a null frame carrying flow control information.

13. The flow control method according to claim 4, comprising:
detecting whether congestion occurs in the logical sub-channels of the board, comprises detecting whether data packet quantity in a logical sub-channel buffer exceeds a predefined maximum threshold; and
detecting whether congestion in the logical sub-channel of the board is over, comprises detecting whether the data packet quantity in the logical sub-channel buffer is less than a predefined minimum threshold.

14. The flow control method according to claim 13, the logical sub-channel mapping module feeding back to the packet forwarding module, further comprising:
the logical sub-channel buffer generating a back pressure signal, the logical sub-channel mapping module receiving the back pressure signal, generating the channel-level flow control frame and transparently transmitting the channel-level flow control frame to the packet forwarding module through the board mapping module.

15. The flow control method according to claim 13, the logical sub-channel mapping module feeding back to the packet forwarding module, further comprising:
the logical sub-channel buffer generating a back pressure signal, the logical sub-channel mapping module receiving the back pressure signal, generating the channel-level flow control frame, the board mapping module combining the received channel-level flow control frame with the board-level flow control frame as one board-level flow control frame, then transmitting the combined board-level flow control frame to the packet forwarding module.

16. A flow control method comprising;
detecting whether congestion occurs in a data transmission port of a transmission equipment at a receiving end, if yes, a packet forwarding module feeding back an Ethernet flow control frame to a transmission equipment at a sending end, the transmission equipment at the sending end pausing sending data packets after receiving the Ethernet flow control frame; detecting whether congestion in the data transmission port is over, if yes, the transmission equipment at the sending end continuing to transmit data packets, otherwise the packet forwarding module at a receiving end continuing to feed back the Ethernet flow control frame to the transmission equipment at the sending end, thereby establishing flow control of the data transmission port; and
detecting whether congestion occurs on one of boards connecting with the data transmission port of the transmission equipment, if yes, a board mapping module feeding back a board-level flow control frame to the packet forwarding module, the board-level flow control frame at least comprising an SOF (Start of Frame), a board number, a logical sub-channel number, flow control information, a payload and an EOF (End of Frame); the packet forwarding module pausing sending data packets to the board connecting with the data transmission port after receiving the board-level flow control frame; detecting whether congestion in the board connecting with the data transmission port is over, if yes, the packet forwarding module continuing to send data packets to the board connecting with the data transmission port, otherwise the board mapping module continuing to feed back the board-level flow control frame to the packet forwarding module, thereby establishing flow control of the board connecting with the data transmission port.

* * * * *

UNITED STATES PATENT AND TRADEMARK OFFICE
CERTIFICATE OF CORRECTION

| | | |
|---|---|---|
| PATENT NO. | : 7,593,328 B2 | Page 1 of 1 |
| APPLICATION NO. | : 11/131966 | |
| DATED | : September 22, 2009 | |
| INVENTOR(S) | : Wu Yang et al. | |

It is certified that error appears in the above-identified patent and that said Letters Patent is hereby corrected as shown below:

On the Cover Page:

At field (30), "02 1 48769" should be -- 02148769.3 --.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.        : 7,593,328 B2                      Page 1 of 1
APPLICATION NO. : 11/131966
DATED             : September 22, 2009
INVENTOR(S)       : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twenty-first Day of September, 2010

David J. Kappos
*Director of the United States Patent and Trademark Office*